(12) United States Patent
Driker et al.

(10) Patent No.: US 8,181,353 B2
(45) Date of Patent: May 22, 2012

(54) ENCODER

(75) Inventors: Michael Driker, Maalot (IL); Ofer Vitner, Haifa (IL); Josef Siraky, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 19 days.

(21) Appl. No.: 12/894,207

(22) Filed: Sep. 30, 2010

(65) Prior Publication Data

US 2011/0078911 A1    Apr. 7, 2011

(30) Foreign Application Priority Data

Oct. 1, 2009   (EP) .................................. 09012451

(51) Int. Cl.
*G01D 5/347* (2006.01)
(52) U.S. Cl. ....................................... 33/1 PT
(58) Field of Classification Search ................. 33/1 PT
See application file for complete search history.

(56) References Cited

U.S. PATENT DOCUMENTS

| | | | | |
|---|---|---|---|---|
| 4,193,199 | A * | 3/1980 | Whiteley et al. | 33/1 PT |
| 4,285,595 | A * | 8/1981 | Fryer et al. | 356/150 |
| 4,463,299 | A * | 7/1984 | Langley et al. | 318/662 |
| 4,942,295 | A | 7/1990 | Brunner et al. | |
| 5,040,298 | A * | 8/1991 | Weber | 33/1 N |
| 5,218,769 | A * | 6/1993 | Tranchon | 33/1 PT |
| 5,263,258 | A * | 11/1993 | Dobler et al. | 33/1 N |
| 5,301,434 | A * | 4/1994 | Imaizumi | 33/1 N |
| 5,311,666 | A * | 5/1994 | Jacobsen et al. | 33/1 PT |
| 5,657,544 | A * | 8/1997 | Ota et al. | 33/1 N |
| 6,668,464 | B2 * | 12/2003 | Mitterreiter et al. | 33/1 PT |
| 7,406,772 | B2 * | 8/2008 | Siraky | 33/1 PT |
| 7,774,945 | B2 * | 8/2010 | Sano | 33/1 PT |
| 2002/0002777 | A1 | 1/2002 | Torr | |
| 2008/0054765 | A1 | 3/2008 | Siraky et al. | |
| 2008/0120851 | A1 * | 5/2008 | Brandl | 33/1 PT |

FOREIGN PATENT DOCUMENTS

| | | |
|---|---|---|
| EP | 0 557 564 A1 | 9/1993 |
| EP | 1 724 557 A2 | 11/2006 |
| GB | 2 343 510 A | 5/2000 |

OTHER PUBLICATIONS

Extended European Search Report of parallel pending European patent application No. 09 012 451.2; issued on Mar. 26, 2010.

* cited by examiner

*Primary Examiner* — Christopher Fulton
(74) *Attorney, Agent, or Firm* — The Nath Law Group; Jerald L. Meyer (57) ABSTRACT

An encoder for detecting measured values dependent on the rotation angle of the shaft of a motor includes a rotor, which can be fixed on the shaft, and a stator housing, which can be fixed by a bearing surface on an attachment surface of the motor and has a scanning means for detecting the relative rotational position of rotor and stator. In the mounted state, the rotor is fixed on the shaft and the housing is fixed on the attachment surface in such a way that the rotor and the scanning means have a defined axial distance (h). Additionally for mounting purposes, the encoder is pushed onto the shaft until the housing is held in a mounting auxiliary position with its bearing surface at an axial distance from the attachment surface, the axial distance corresponding to the defined distance (h).

8 Claims, 6 Drawing Sheets

ENCODER

The invention relates to an encoder for detecting measured values which are dependent on the rotation angle of the shaft of a motor or the like by means of an encoder.

Encoders serve for measuring the rotation angle of two objects that can be rotated relative to one another, or for measuring variables that are dependent on said rotation angle, such as, for example, the angular velocity, the angular acceleration or the like. The most frequent application for the encoder is use in motors, for example for servo drives, wherein the rotation angle of the shaft of the motor with respect to the motor housing is detected. The invention is described hereinafter on the basis of this application, although the invention is not restricted to this application. Therefore, the designations "shaft" and "motor" are merely representative of two arbitrary objects which can be rotated relative to one another and the relative rotation angle position of which is intended to be detected.

Encoders have a rotor and a stator. The rotor is connected to the shaft in a rotationally fixed manner, while the stator is attached to the motor housing, in particular an attachment surface of the motor, in a rotationally fixed manner. The stator carries a scanning means, which scans a material measure of the rotor in incremental or absolute fashion in order to detect the angular position of the rotor with respect to the stator. The material measure and the scanning means can be embodied optically, magnetically, inductively or capacitively. In this case, the rotor is embodied, in particular, as a disc which is arranged coaxially on the shaft and which carries the material measure. The scanning means of the stator is arranged at a defined axial distance from the rotor surface carrying the material measure, in order that, on the one hand, an optimum scanning signal is obtained and, on the other hand, the rotor can rotate freely with respect to the stator.

In order to ensure the exact axial alignment of rotor and stator, it is known to mount the rotor axially and radially by means of rolling bearings in the stator. In order to compensate for alignment errors between the encoder axis and the motor axis, either the rotor is elastically fixed on the shaft or the stator is elastically fixed on the attachment surface of the motor.

Encoders of the generic type mentioned in the introduction are furthermore known which are cost-effective by virtue of the fact that the rotor is not mounted by means of rolling bearings in the stator. Rotor and stator of the encoder are initially components that are freely moveable relative to one another. During the mounting of the encoder, the rotor is fixed on the shaft of the motor, while the stator is fixed on the attachment surface of the motor. Therefore, during the mounting of the encoder on the motor, it is necessary to align the position of the rotor on the shaft and the position of the stator on the attachment surface of the motor such that the rotor has exactly the required defined axial distance from the stator and the scanning means.

EP 1 895 277 B1 discloses, for this purpose, during the mounting of the encoder, pushing the latter onto the shaft of the motor, wherein the stator of the encoder firstly passes into a mounting auxiliary position, in which the stator is held at the defined distance from the attachment surface of the motor, said distance corresponding to the required defined distance between rotor and stator during operation. While the stator is held in this mounting auxiliary position, the rotor lying freely in the encoder is axially displaced on the shaft in such a way that it bears against the stator with the scanning means. In this position, the rotor is fixed on the shaft of the motor. The stator is then brought from the mounting auxiliary position into the mounting end position, in which it is fixed on the attachment surface of the motor. Since the stator of the encoder is in this case moved by the defined axial distance, the stator is also displaced with the scanning means by said defined distance with respect to the rotor, such that, in the mounting end position, the rotor and the stator of the encoder have precisely the desired defined axial distance. In the case of this known encoder, the stator is supported in the mounting auxiliary position by a coaxial elastic spring ring in a manner spaced apart from the attachment surface of the motor. In order to bring the stator from the mounting auxiliary position into the mounting end position, the stator is pressed onto the attachment surface of the motor against the spring force of said elastic spring ring.

The invention is based on the object of providing an encoder of the generic type mentioned in the introduction with a simplified construction. This object is achieved according to the invention by means of an encoder comprising a rotor, which can be fixed on the shaft, and comprising a stator, which can be fixed by a bearing surface on an attachment surface of the motor and has a scanning means for detecting the relative rotational position of rotor and stator.

Advantageous embodiments of the invention are specified in the dependent claims.

In the case of the encoder according to the invention, the stator of the encoder bears with a bearing surface against the attachment surface of the motor and is fixed on said attachment surface. The bearing surface of the encoder has a shoulder projecting beyond the plane of the bearing surface, the height of said shoulder corresponding to the defined axial distance that the rotor and the stator have to assume in the mounting end state. In the mounting auxiliary position, the stator of the encoder bears against the attachment surface of the motor by said shoulder, such that the bearing surface of the stator and the attachment surface of the motor have the desired axial distance. In said mounting auxiliary position, the rotor is axially displaced on the shaft until it comes to bear against the stator, and is fixed on the shaft in this position. The stator of the encoder is then rotated about its axis, whereby the projecting shoulder passes into an angular position in which it can descend axially into a recessed receptacle of the attachment surface of the motor. As a result, the stator of the encoder can be brought by its bearing surface into contact with the attachment surface of the motor and pass into the mounting end position, in which it is fixed on the attachment surface of the motor.

The encoder according to the invention is constructed extremely simply and cost-effectively since it requires only the formation of a stepped shoulder on the bearing surface of the stator for the exact axial alignment of rotor and stator. The processes of pushing the encoder onto the shaft, fixing the rotor on the shaft, rotating the stator from the mounting auxiliary position into the mounting end position and fixing the stator on the attachment surface of the motor can without exception be carried out with axial access from the end of the shaft of the motor. Therefore, the installation and the alignment of the encoder are possible even in the case of restricted space conditions.

The invention is explained in more detail below on the basis of an exemplary embodiment illustrated in the drawing, in which.

The exemplary embodiment illustrated in the drawing shows an encoder with a stator. The stator has a housing 10. The housing 10 comprises a circular-disc-shaped base 12 with a cylindrical outer wall 14 and is closed off on the top side by a cover 16, which is screwed to the outer wall 14 by means of screws 17. A scanning means is provided in the housing 10, said scanning means comprising a circular-disc-shaped lower printed circuit board 18 and an upper circular-disc-shaped printed circuit board 20. The lower printed circuit board 18 is seated on the base 12 of the housing, while the upper printed circuit board 20 is held at an axial distance from the lower printed circuit board 18 by means of a spacer ring 22. The upper printed circuit board 20 carries electronic components 24 of the scanning means, by way of example. The components 24 are connected to a connecting line (not illustrated) that is led out from the housing 10, wherein the connection is covered by a covering cap 26.

A rotor 28 is arranged coaxially within the housing 10, said rotor being accommodated axially and radially with play in the housing 10. The rotor 28 has a hollow-cylindrical hub sleeve 30 having axial slots 32 in its axially upper region, whereby elastically inwardly bendable clamping jaws 34 are formed. In the region of said clamping jaws 34, the hub sleeve 30 is coaxially enclosed. The clamping ring 36 can be drawn axially onto the hub sleeve 30 by means of axially parallel clamping screws 38, whereby the clamping ring 36 presses the clamping jaws 34 radially inwards in the manner of a clamping sleeve.

The hub sleeve 30 carries a circular-disc-shaped rotor disc 40, which is arranged coaxially on the outside of the hub sleeve 30. The rotor disc 40 lies axially between the printed circuit boards 18 and 20 in a plane perpendicular to the encoder axis. The rotor disc 40 carries an incremental or absolute material measure, which is scanned by the scanning means carried by the printed circuit boards 18 and 20 and having the components 24, in order to generate measured value signals which are dependent on the angular position of the rotor disc 40 relative to the printed circuit boards 18 and 20. The material measure and the scanning means can be embodied optically, magnetically, inductively or capacitively in a manner known per se.

In the non-mounted state of the encoder as shown in FIGS. 1 to 4, the rotor 28 lies with the rotor disc 40 loosely in the housing 10 with the printed circuit boards 18 and 20. During the operation of the encoder, however, the rotor disc 40 must, on the one hand, be able to rotate freely and contactlessly between the printed circuit boards 18 and 20 and, on the other hand, comply with a defined axial distance from the printed circuit boards 18 and 20 in order to obtain an optimum scanning signal. In the drawing said defined axial distance is depicted as distance h between the lower printed circuit board 18 and the rotor disc 40. This requirement is fulfilled according to the invention in the manner explained below.

Figure 1:
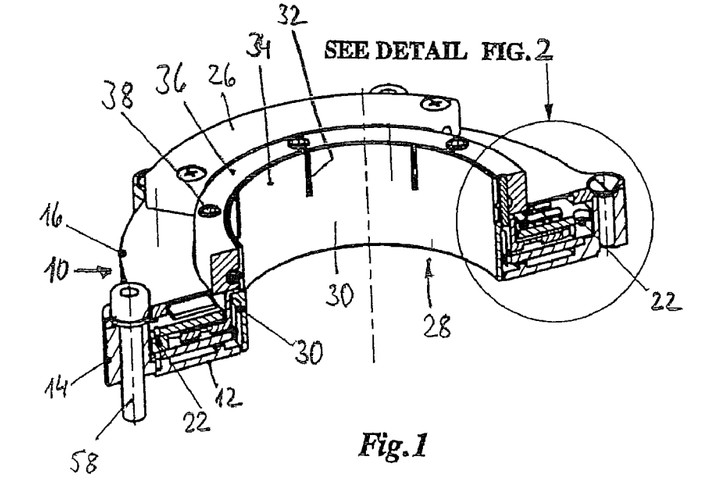
FIG. 1 shows an axially sectioned encoder in perspective.
Figure 2:
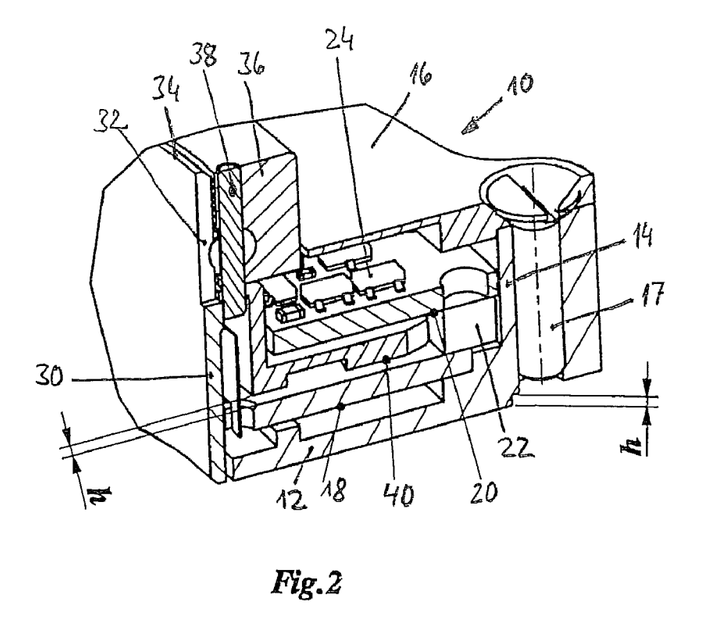
FIG. 2 shows an enlarged partial illustration from FIG. 1.
Figure 3:
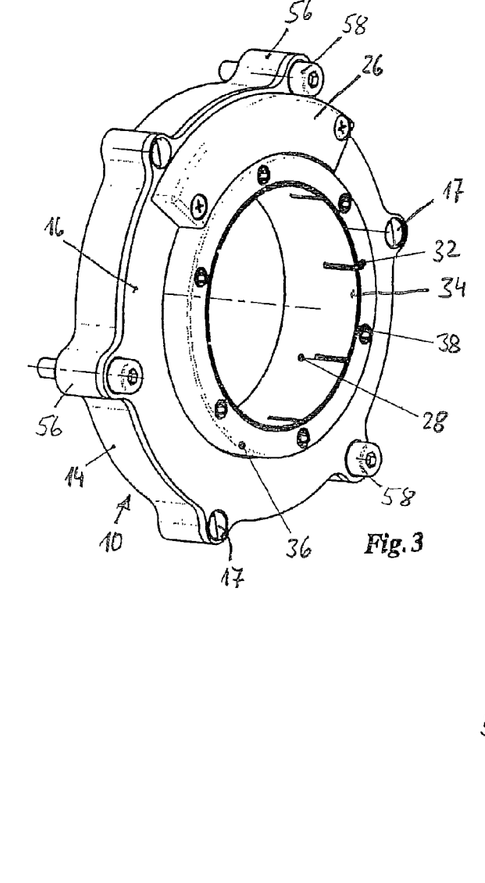
FIG. 3 shows the encoder perspectively in plan view.
Figure 4:
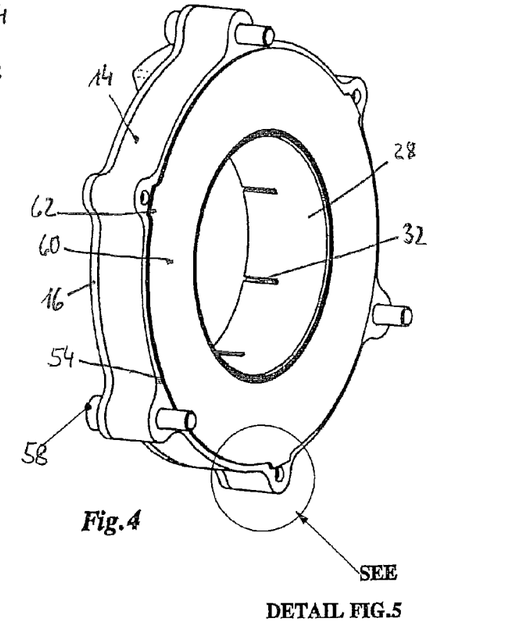
FIG. 4 shows the encoder perspectively in a view from below.
Figure 5:
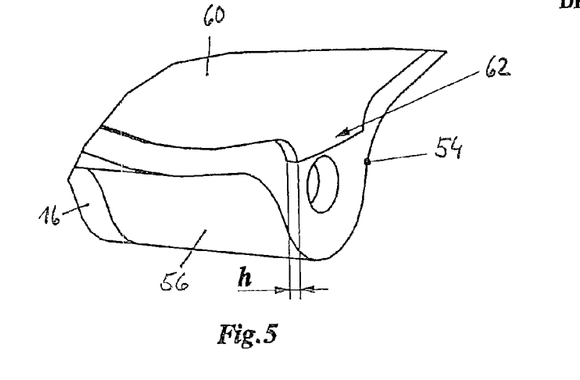
FIG. 5 shows an enlarged detail illustration from FIG. 4.
Figure 6:
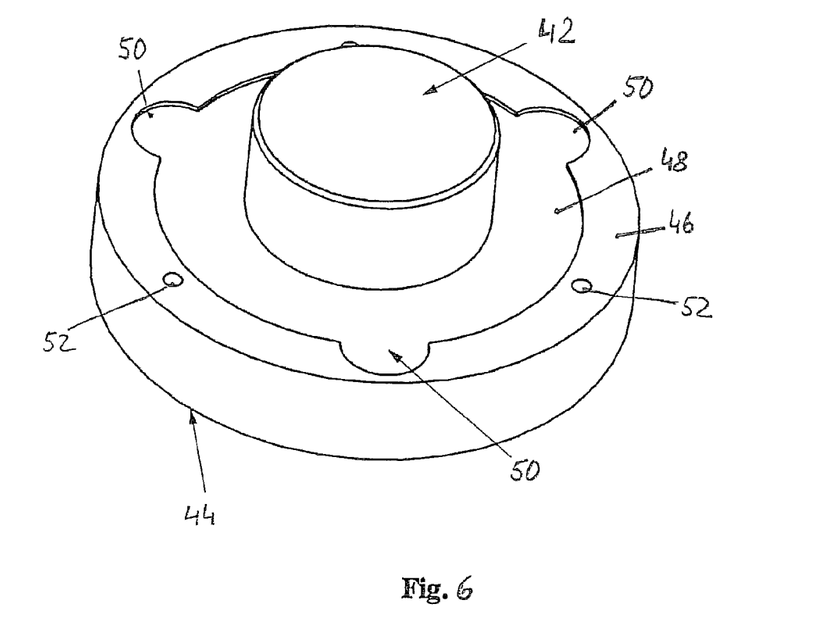
FIG. 6 shows a perspective view of the motor with the attachment surface.

The encoder is preferably attached to a motor, for example an electric motor, as is shown in FIG. 6. The motor has a shaft 42, which is mounted such that it is driven in rotatable fashion in a motor housing 44. The motor housing 44 has an attachment surface 46 running coaxially with respect to the shaft 42 in a plane perpendicular to the shaft 42. The encoder is placed by its rotor 28 onto the shaft 42 and fixed on the shaft 42, while the stator of the encoder is fixed on the attachment surface 46 of the motor housing 44, such that the encoder measures the rotation of the shaft 42 relative to the motor housing 44.

A receptacle 48 is incorporated in the attachment surface 46 of the motor housing 44, said receptacle coaxially enclosing the shaft 42 in circular-disc-shaped fashion and being recessed by a magnitude H with respect to the plane of the attachment surface 46. The receptacle 48 has, at a plurality of circumferential locations, protuberances 50 in which the receptacle 48 is expanded radially outwards over its circular circumference. Three protuberances 50 at a mutual angular distance of 120° are illustrated in the exemplary embodiment. Threaded holes 52 are furthermore provided in the attachment surface 46. In the exemplary embodiment illustrated, three threaded holes 52 are arranged in each case at an angular distance centrally between the protuberances 50.

In the case of the encoder, the outer surface of the base 12 is embodied as a bearing surface 54 of the stator. The bearing surface 54 is embodied in annular-disc-shaped fashion coaxially with respect to the encoder axis. Three radially outwardly curved projections 56 are integrally formed on the outer circumference of the circular-cylindrical outer wall 14 of the housing 10, said projections being offset at an angle in each case by 120° relative to one another, for example. The projections 56 have holes which are continuous in axially parallel fashion and into which fixing screws 58 are inserted. The holes in the projections 56 correspond in terms of radius and angular pitch to the threaded holes 52 in the attachment surface 46. The bearing surface 54 has a shoulder 60, which projects in stepped fashion beyond the plane of the bearing surface 54 and has a surface that is plane-parallel to the plane of the bearing surface 54. The shoulder 60 extends in the form of an annular disc radially from the inner circumference of the bearing surface 54 as far as an outer radius corresponding to the inner radius of the receptacle 48 of the attachment surface 46 of the motor housing 44.

The shoulder 60 projects beyond the plane of the bearing surface 54 with an axial height h, wherein said height h corresponds to the axial distance h that has to exist between the rotor disc 40 and the lower printed circuit board 18 during operation of the encoder. Said height h is less than the depth H of the receptacle 48. The shoulder 60 has radial extensions 62 on its outer circumference, said radial extensions projecting beyond the circular outer circumference of the shoulder 60. The extensions 62 correspond in terms of their angular arrangement to the protuberances 50 of the receptacle 48 in the attachment surface 46 of the motor housing 44. In the exemplary embodiment illustrated, three extensions 62 are accordingly provided at an angular distance of 120°, wherein said extensions 62 are arranged at half the angular distance between the projections 56, as can best be seen in FIG. 4. By way of example, the extensions 62 are in each case arranged in the angular range of the screws 17 used to fix the cover 16 to the outer wall 14.

Figure 7:
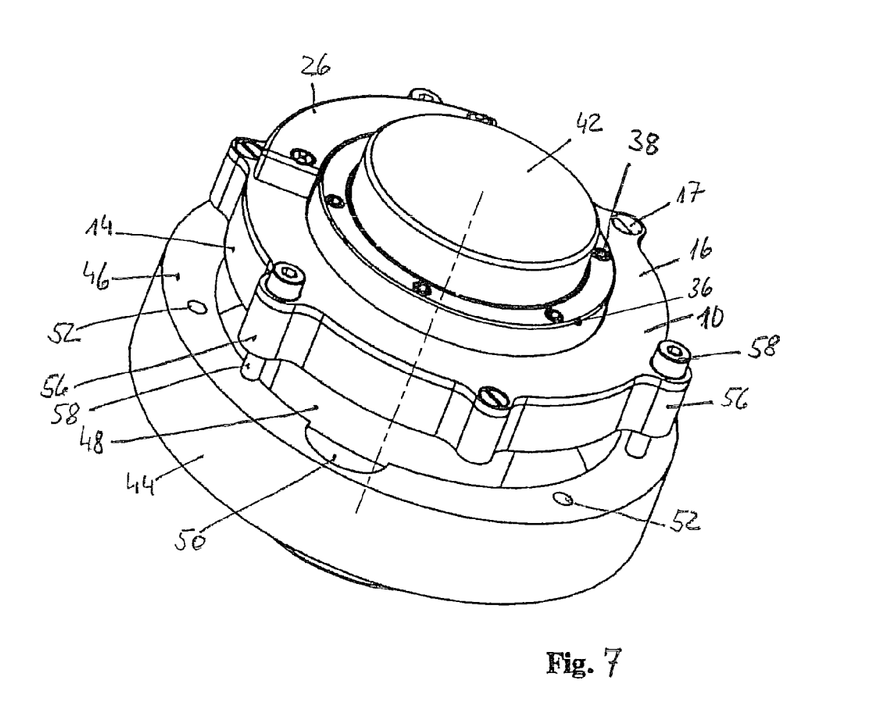
FIG. 7 shows the motor with emplaced encoder.
Figure 8:
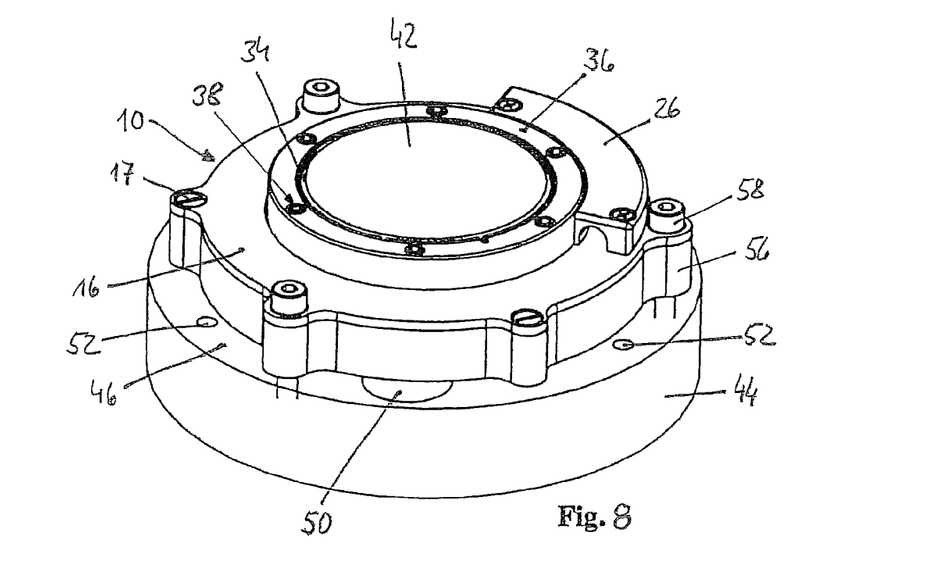
FIG. 8 shows the motor with the encoder in the mounting auxiliary position.
Figure 9:
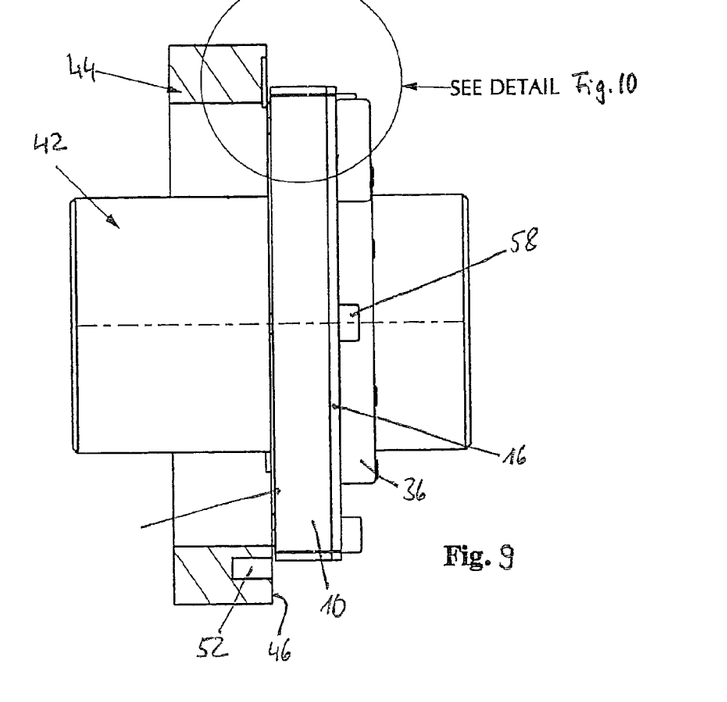
FIG. 9 shows an axial section of the motor with emplaced encoder in the mounting auxiliary position.
Figure 10:
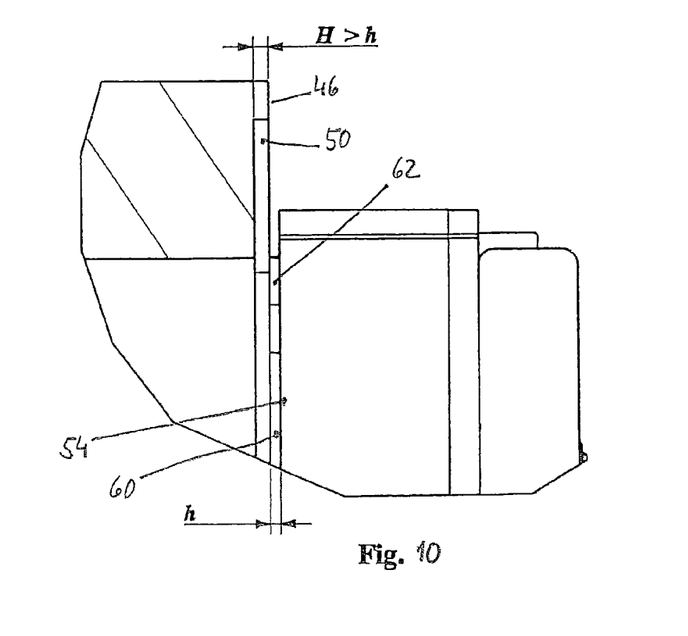
FIG. 10 shows an enlarged detail illustration from FIG. 9.

The mounting of the encoder on the motor takes place in the following manner:

In the unmounted state, the rotor 28 lies loosely in the housing 10 of the encoder. In this state, the encoder is placed onto the motor by the encoder being axially pushed onto the shaft 42 of the motor by its rotor 28, as shown in FIG. 7. The encoder is pushed axially onto the shaft 42 until the housing 10 bears against the attachment surface 46 of the motor housing 44. In this case, the housing 10 is rotated about the axis of the shaft 42 in such a way that the extensions 62 of the shoulder 60 of the bearing surface 54 are rotated at an angle relative to the protuberances 50 of the receptacle 48 of the attachment surface 46. Since the extensions 62 project radially beyond the outer circumference of the receptacle 48, the housing 10 is seated with the extensions 62 of the shoulder 60 on the attachment surface 46 of the motor housing 44. The bearing surface 54 of the housing 10 thus has the axial distance h of the height of the shoulder from the attachment surface 46. This mounting auxiliary position is shown in FIGS. 8 to 10.

Figure 11:
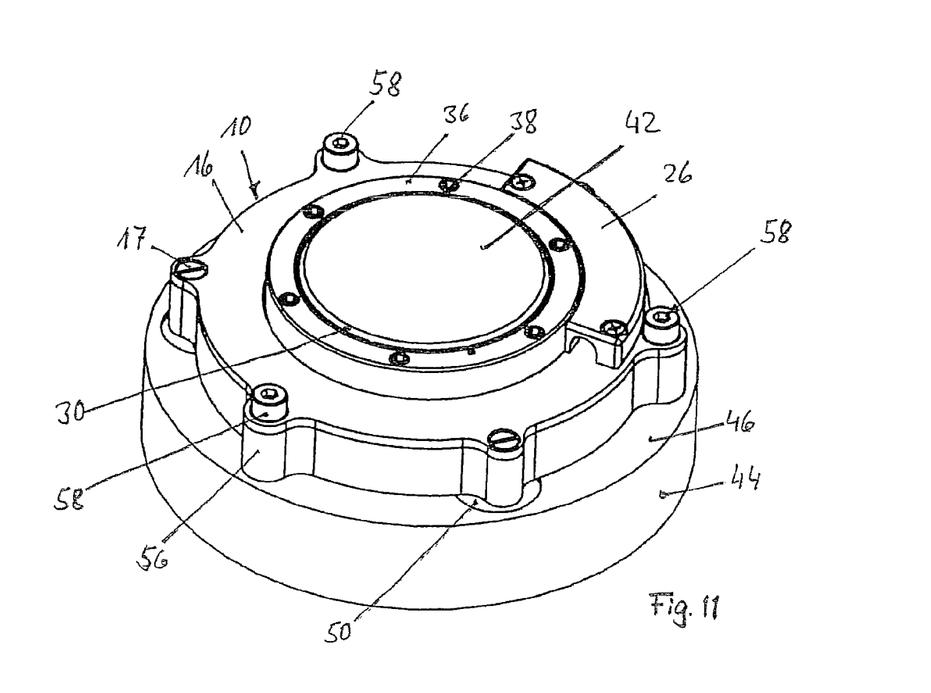
FIG. 11 shows the motor with the encoder in the mounting end position.
Figure 12:
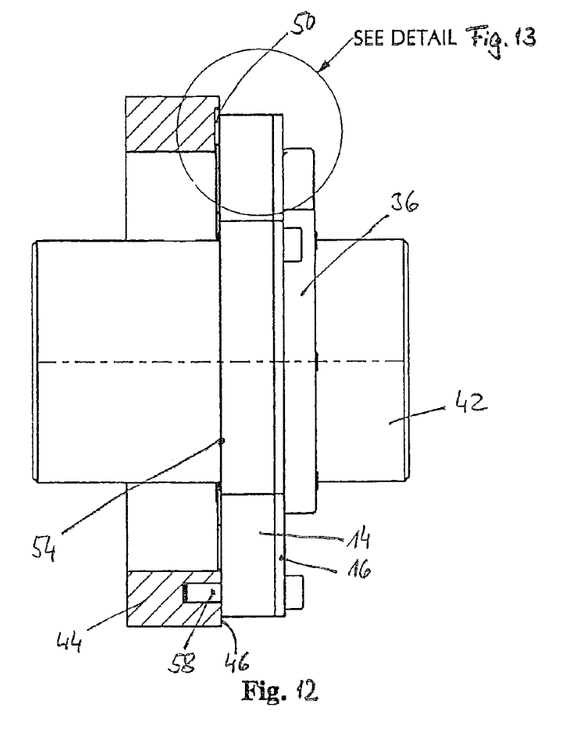
FIG. 12 shows an axial section of the motor with the encoder in the mounting end position.
Figure 13:
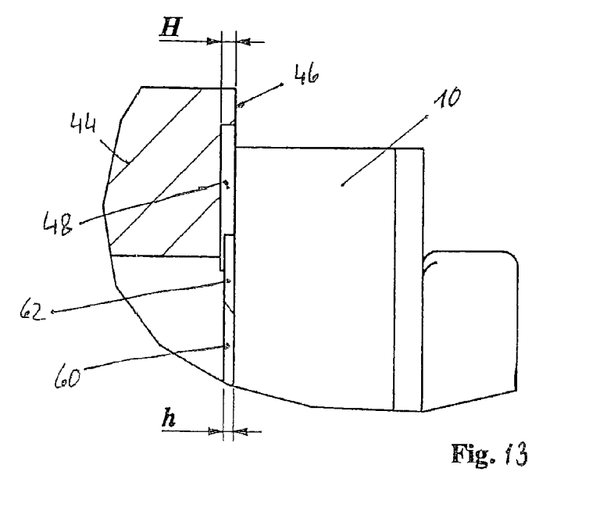
FIG. 13 shows an enlarged detail illustration from FIG. 12.

As soon as the encoder is situated with its housing 10 in this mounting auxiliary position, the rotor 28 is axially displaced by its hub sleeve 30 and the rotor disc 40 on the shaft 42 until the rotor disc 40 bears axially against the lower printed circuit board 18 of the stator. In this position of the rotor 28, the rotor 28 is fixedly clamped on the shaft 42 by the clamping screws 38 being tightened and the clamping ring 36 bracing the clamping jaws 34 radially on the shaft 42. As soon as the rotor 28 has been fixed on the shaft 42, the housing 10 of the encoder is rotated about its axis until the extensions 62 of the shoulder 60 of the bearing surface 54 attain congruence with the protuberances 50 of the receptacle of the attachment surface 46. In this case, the fixing screws 58 of the housing 10 also attain congruence with the threaded holes 52 of the attachment surface 46. The shoulder can then descend axially into the receptacle 48, wherein the extensions 62 of the shoulder 60 descend axially into the protuberances 50 of the receptacle 48. In this case, the housing 10 and thus the stator of the encoder move by the height h of the shoulder 60 axially relative to the attachment surface 46. The bearing surface 54 comes to bear against the attachment surface 46. In this mounting end position, the housing 10 is fixed by its bearing surface 54 on the attachment surface 46 by the fixing screws 58 being screwed into the threaded holes 52. This mounting end position is shown in FIGS. 11 to 13.

With the housing 10, the printed circuit boards 18 and 20 of the stator of the encoder that are mounted in the housing 10 also move by the distance h in the axial direction, with the result that the lower printed circuit board 18 assumes the predetermined defined axial distance h from the rotor disc 40 fixed on the shaft 42. The encoder has thereby been mounted on the motor in a manner ready for operation.

LIST OF REFERENCE SYMBOLS

10 Housing
12 Base
14 Outer wall
16 Cover
17 Screws
18 Lower printed circuit board
20 Upper printed circuit board
22 Spacer ring
24 Electronic components
26 Covering cap
28 Rotor
30 Hub sleeve
32 Axial slots
34 Clamping jaws
36 Clamping ring
38 Clamping screws
40 Rotor disc
42 Shaft
44 Motor housing
46 Attachment surface
48 Receptacle
50 Protuberances
52 Threaded holes
54 Bearing surface
56 Projections
58 Fixing screws
60 Shoulder
62 Extensions

The invention claimed is:

1. An encoder for detecting measured values which are dependent on the rotation angle of the shaft of a motor, comprising a rotor, which can be fixed on the shaft, and comprising a stator, which can be fixed by a bearing surface on an attachment surface of the motor and has a scanning means for detecting the relative rotational position of rotor and stator, wherein, in the mounted state, the rotor is fixed on the shaft and the stator is fixed on the attachment surface in such a way that the rotor and the scanning means have a defined axial distance (h), and wherein, for mounting purposes, firstly the encoder is pushed onto the shaft until the stator is held in a mounting auxiliary position with its bearing surface at an axial distance from the attachment surface, the axial distance corresponding to the defined distance (h), then the rotor, in this mounting auxiliary position of the stator, is brought axially to bear against the scanning means and is fixed on the shaft and, finally, the stator is moved by its bearing surface by the defined distance (h) towards the attachment surface into a mounting end position and is fixed on the attachment surface,
characterized in that the bearing surface of the stator has a shoulder projecting beyond the plane of the bearing surface by the height of the defined distance (h), in that, in the mounting auxiliary position, the stator bears against the attachment surface by the shoulder, and in that, in a mounting end position rotated about the axis of the encoder relative to the mounting auxiliary position, the shoulder descends into a recessed receptacle of the attachment surface, such that the stator is displaced with the scanning means by the defined axial distance (h) axially relative to the rotor fixed on the shaft.

2. The encoder according to claim 1,
characterized in that the receptacle is recessed with respect to the plane of the attachment surface by a magnitude (H) that is greater than the height (h) of the shoulder above the bearing surface.

3. The encoder according to claim 1,
characterized in that the receptacle of the attachment surface and the shoulder of the bearing surface are embodied in a circular-disc-shaped fashion with the same outer circumference, in that the receptacle has protuberances extended radially outwards on its outer circumference, and in that the shoulder has extensions directed outwards in a corresponding angular position, wherein, in the mounting auxiliary position, the extensions of the shoulder are seated axially on the attachment surface and, in the mounting end position, attain congruence in the angular position with the protuberances of the receptacle and descend into the latter.

4. The encoder according to claim 3,
characterized in that in each case three protuberances of the receptacle and extensions of the shoulder are provided, which are offset at an angle by 120° relative to one another.

5. The encoder according to claim 3,
characterized in that fixing screws are provided on the stator, which fixing screws can be screwed into threaded holes in the attachment surface of the motor housing, and in that the fixing screws and the threaded holes are arranged at an angle in the circumferential direction in each case between the extensions of the shoulder and, respectively, the protuberances of the receptacle.

6. The encoder according to claim 1, characterized in that the rotor has a rotor disc, which is arranged such that it can be rotated axially between printed circuit boards of the stator.

7. The encoder according to claim 6,
characterized in that the rotor has a hub sleeve, which carries the rotor disc and which can be clamped on the shaft.

8. The encoder according to claim 7,
characterized in that the hub sleeve is axially slotted and can be clamped by means of axially parallel clamping screws.

* * * * *